United States Patent [19]
Wedemeyer et al.

[11] 3,912,783
[45] Oct. 14, 1975

[54] PROCESS AND CATALYST FOR PREPARING OF 3-HALOGEN-AND 3,5-DIHALOGEN-PHENOLS

[75] Inventors: Karlfried Wedemeyer, Cologne; Eliahu Koppelmann, Leverkusen; Werner Evertz, Monheim, all of Germany

[73] Assignee: Bayer Aktiengesellschaft, Leverkusen, Germany

[22] Filed: Nov. 28, 1973

[21] Appl. No.: 419,855

[30] Foreign Application Priority Data
Dec. 5, 1972  Germany............................ 2259433
Sept. 6, 1973  Germany............................ 2344925

[52] U.S. Cl. .............. 260/620; 252/439; 260/340.7; 260/570.9; 260/609 R; 260/612 R; 260/612 D; 260/613 R; 260/613 D; 260/619 R; 260/619 A; 260/621 R; 260/623 R

[51] Int. Cl.² ...................... C07C 39/24; C07C 39/28; C07C 39/29

[58] Field of Search .......... 260/340.7, 570.9, 609 R, 260/612 R, 612 D, 613 R, 613 D, 619 A, 619 B, 620, 621 R, 623 R, 619 R; 252/439

[56] References Cited
OTHER PUBLICATIONS
Freifelder, "Practical Catalytic Hydrogenation," pp. 3, 4, 15, 35–39, 74, 75, 78–82, 451, 452, 473–476, 550–552, 554–556, 645–647 (1971).
Weygand, "Preparative Organic Chemistry," pp. 66 (1972).
Bornstein et al., "Chem. and Industry," Vol. 1958, pp. 441–442 (1958).

*Primary Examiner*—Norman P. Morgenstern
*Attorney, Agent, or Firm*—Burgess, Dinklage & Sprung

[57] ABSTRACT

3-Halogen- and 3,5-dihalogen-phenols are prepared from higher-halogenated compounds having the formula

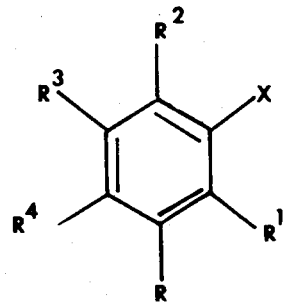

wherein:
X represents halogen,
$R^1$, $R^2$, $R^3$ and $R^4$ independently of one another represent hydrogen, halogen, an alkyl, aralkyl, aryl, alkoxy aryloxy, alkylmercapto or dialkylaminomethyl radical, in addition to which at least one of the radicals $R^1$, $R^2$ or $R^4$ represents a halogen atom while the radical $R^3$ can also represent a hydroxy group and, in the case of 3,5-dihalogenphenols, exclusively represents a halogen atom,
R represents OH, in addition to which R together with $R^1$ can represent the radical — O — $CH_2$ — O — $CH_2$ —, the phenol oxygen atom standing for R, in which case, X, $R^2$, $R^3$ and $R^4$ independently of one another represent hydrogen, halogen or an alkyl radical and at least one of the radicals
X or $R^3$ and at least one of the radicals $R^2$ or $R^4$ represents a halogen atom, by reacting same with hydrogen at elevated temperature in the presence of noble metals of Group VIII of the Periodic System and catalysts containing sulphur and/or sulphur compounds.

8 Claims, No Drawings

3,912,783

PROCESS AND CATALYST FOR PREPARING OF 3-HALOGEN-AND 3,5-DIHALOGEN-PHENOLS

BACKGROUND

This invention relates to a process for the production of 3-halogen- phenols and 3,5-dihalogen-phenols by the partial dehalogenation of higher-halogenated phenols using catalytic hydrogenation, and to the catalysts used for this process.

Convention methods of producing 3-halogen- and 3,5-dihalogen-phenols are complicated and expensive both in terms of labour and in terms of costs to carry out in practice.

For example, 3-halogenphenol can be produced by diazotizing and boiling 3-halogen aniline obtained by the halogenation of nitrobenzene, which yields almost excluseively 3-halogen-1-nitrobenzene, followed by catalytic hydrogenation (cf. Beilsteins Handbuch det organischen Chemie, 4th Edition, Vol. VI, page 185).

Although the alkaline hydrolysis of corresponding dihalogen and trihalogen benzenes to form the 3-halogen- and 3,5-dihalogen-phenols is also known, the dihalogen and trihalogen benzenes required as starting materials have to be used in a purity which can only be obtained with difficulty (cf. Chemischer Informationsdienst, 1971, B-24-232).

It is also known that halogenated phenols can be catalytically hydrogenated. Unfortunately, this process only gives phenol (cf. Houben-Weyl, Methoden der Organischen Chemie, 4th Edition, Vol. V/4, page 772).

SUMMARY

It has now surprisingly been found that 3-halogen- and 3,5-dihalogne-phenols can readily be obtained selectively from higher-halogenated compounds by treating halogen compounds corresponding to the general formula

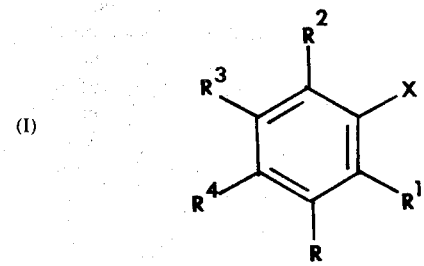

(I)

in which
X represents halogen,
$R^1$, $R^2$, $R^3$ and $R^4$ independently of one another represent hydrogen, halogen, an alkyl-, aralkyl-, aryl-, alkoxy-, aryloxy-, alkylmercapto- or dialkylaminomethyl radical, or one of the radicals $R^1$, $R^2$ or $R^4$ represents a halogen atoms whilst the radical $R^3$ can also represent a hydroxy group, and, in the production of 3,5-dihalogen-phenols, exclusively represents a halogen atom;
R represents OH; or R together with $R^1$ represents the radical — O — CH$_2$ — O — CH$_2$ —, R representing the phenol oxygen, in which case
X, $R^2$, $R^3$ and $R^4$ independently of one another represent hydrogen, halogen or an alkyl radical, and at least one of the radicals X or $R^3$ and at least one of the radicals $R^2$ or $R^4$ represents a halogen atom with hydrogen at an elevated temperature in the presence of noble metals of Group VIII of the Periodic System and catalysts containing sulphur and/or sulphur compounds.

DESCRIPTION

Suitable halogen atoms for the radicals X and $R^1$ to $R^4$ and fluorine, chlorine, bromine, iodine, preferably chlorine and bromine.

Suitable alkyl radicals $R^1$ to $R^4$ are linear or branched alkyl radicals with up to 12 carbon atoms and preferably with up to 6 carbon atoms, also cycloalkyl radicals, preferably those with 5 or 6 carbon atoms in the ring.

The methyl, ethyl, propyl, isopropyl and tert.-butyl radicals are mentioned as specific examples.

The benzyl radical and substituted benzyl radicals represent preferred aralkyl radicals $R^1$ to $R^4$.

Suitable substituents for the arylalkyl radicals $R^1$ to $R^4$ substituted in the aryl nucleus include halogen (fluorine, chlorine, bromine and iodine), preferably chlorine and bromine; the hydroxy group; linear or branched alkyl radicals with up to 12 carbon atoms and preferably with up to 6 carbon atoms; cycloalkyl radicals, preferably with 5 or 6 carbon atoms in the ring; aryl radicals, especially the phenyl radical.

The phenyl radical and substituted phenyl radicals represent preferred aryl radicals $R^1$ to $R^4$.

Substituents for the aryl radicals $R^1$ to $R^4$ include halogen (fluorine, chlorine, bromine and iodine), preferably chlorine and bromine, the hydroxy group, linear or branched alkyl radicals with up to 12 carbon atoms and preferably with up to 6 carbon atoms, cycloalkyl radicals, preferably with 5 or 6 carbon atoms in the ring, aryl radicals, especially the phenyl radical.

Alkoxy- and alkyl-mercapto radicals $R^1$ to $R^4$ include linear or branched radicals with up to 12 and preferably with up to 6 carbon atoms, also cycloalkyl radicals, preferably those with 5 or 6 carbon atoms in the ring.

The phenoxy radical and substituted phenoxy radicals represent preferred aryloxy radicals.

Substituents for the aryloxy radicals $R^1$ to $R^4$ include halogen (fluorine, chlorine, bromine and iodine), preferably chlorine and bromine, the hydroxy group, linear or branched alkyl radicals with up to 12 carbon atoms and preferably with up to 6 carbon atoms, cycloalkyl radicals, preferably with 5 to 6 carbon atoms in the ring, aryl radicals, especially the phenyl radical.

Suitable dialkylamino methyl radicals $R^1$ to $R^4$ include radicals with linear or branched alkyl groups containing up to 12 and preferably up to 6 carbon atoms, also cycloalkyl radicals, preferably those with 5 or 6 carbon atoms in the ring. In addition, the two alkyl groups can also form a common part of a ring.

In cases where polyhalogen phenols are hydrogenated with dialkylamino methyl radicals, dialkylamine is split off in addition to the partial and selective dehalogenation. It is possible in this way to obtain the corresponding methyl-m-halogen phenols.

The compounds corresponding to the general formula above are known and are readily obtainable. The following are mentioned as specific examples of compounds which can be used for the process according to the invention:

2,3-, 2,5-, 3,4-dihalogen-phenols; 2,3,4-, 2,3,6-, 2,4,5-, 2,3,5- and 3,4,5-trihalogen-phenols; 2,3,4,6-, 2,3,4,5-, 2,3,5,6-tetrahalogen-phenols, pentachlorophenol, 2-bromo-3-chlorophenol, 3-bromo-4- chlorophenol, 3-bromo-2-chlorophenol, 2-bromo-5-chlorophenol, 5-bromo-2-chlorophenol, 4-bromo-3-chlorophenol, 4-bromo-2,5-dichlorophenol, 4-chloro-2,3,6-tribromophenol, 4,5,6-trichloro-o-cresol, 5,6-dichloro-o-cresol, 2,4,5,6-tetrachloro-m-cresol, 2,4,5,6-tetrabromo-m-cresol, 2,5-dibromo-p-cresol, 2,5-dichloro-p-cresol, 2,3,5,6-tetra-chloro-p-cresol, 6-chloro-2,5-dibromo-p-cresol, 2,3,6-tribromo-p-cresol, 2,3,5,6-tetrabromo-p-cresol, 2,5-dichloro-[3,4]-xylenol, 2,5,6-tribromo-[3,4]-xylenol, 4-chloro-3-bromo-[2,6]-xylenol, 3,4-dibromo-[2,6]-xylenol, 3,5-dibromo-4-chloro-[2,6]-xylenol, 3,4,5-tribromo-[2,6]-xylenol, 3,4,6-tribromo-[2,5]-xylenol, 2,5-dichloro-4-ethyl phenol, 2,5-dichloro-4-propyl phenol, 2,5-dichloro-4-tert.-butyl phenol, tetrachloro resorcinol, 3,4,6-trichloro-2-benzyl phenol, 2,2'-dihydroxy-3,5,6,3',5',6'-hexachloro diphenyl methane, 3,4,5-trichloro-2-hydroxy diphenyl, 4,4'-dihydroxy-octachloro-diphenyl, 3,4-dichloro-guaiacol, 3,6-dichloro-guaiacol, 4,5-dichloro-guaiacol, 5,6-dichloro-guaiacol, 3,4,6-trichloro-guaiacol, 3,4,5-trichloro-guaiacol, 3,4,5,6-tetrachloro-guaiacol, 4,5-dichloro-3-methoxy phenol, 5,6-dichloro-3-methoxy phenol, 2,5-dichloro-3-methoxy phenol, 4,5,6-trichloro-3-methoxy phenol, 3,4,5,6-tetrachloro-3-methoxy phenol, 2,3-dichloro-4-methoxy phenol, 2,5-dichloro-4-methoxy phenol, 2,3,6-trichloro-4-methoxy phenol, 2,3,5-trichloro-4-methoxy phenol, 2,3,5,6-tetrachloro-4-methoxy phenol, 4,5-dichloro-2-phenoxy phenol, 3,4,5,6-tetrachloro-2-phenoxy phenol, 2,4,5,6-tetrachloro-3-phenoxy phenol, 2,5-dichloro-4-phenoxy phenol, 2,3,5,6-tetrachloro-4-phenoxy phenol, 2,5-dichloro 4-methylmercapto phenol, 2,4,5,6-tetrachloro-4-methylmercaptophenol, 2-(dimethylamino-methyl)-3,6-dichlorophenol, 4-(dimethylamino-methyl)-2,5-dichlorophenol, 2-(dimethylamino-methyl)-3,4,6-trichlorophenol, 2,4-bis-(dimethylamino-methyl)-3,6-dichlorophenol, 2,4-bis-(dipiperidyl amino methyl)-3,6-dichlorophenol, 5,6-dichloro-1,3-benzodioxane, 5,8-dichloro-1,3-benzodioxane, 5,7,8-trichloro-1,3-benzodioxane, 5,6-dichloro-8-methyl benzodioxane and 5,8-dichloro-6-methyl benzodioxane.

The catalysts which can be used for the process according to the invention consist of noble metals of Group VIII of the Periodic System of Elements which are known per se as hydrogenation catalysts (cf. K. A. Hoffmann and U. R. Hoffmann, anorganische Chemie, 12th Edition, Brunswick 1948, page 380) in the form of their metals, oxides and sulphides and sulphur and/or sulphur compounds. Ruthenium, rhodium, palladium, osmium, iridium and platinum, for example, are mentioned as examples of the Group VIII noble metals which can be used in the form of their metals, oxides, and sulphides; palladium and platinum are preferably used.

The sulphur compounds may be inorganic or organic sulphur compounds. They can be either soluble or substantially or completely insoluble in water and solvents. In general, however, it is preferred to use substantially insoluble or completely insoluble sulphur compounds.

Examples of suitable inorganic sulphur compounds include monosulphides and polysulphides, thiosulphates and thiocyanates; the cations can generally be selected as required.

Preferred inorganic sulphur compounds include monosulphides and polysulphides, for example water soluble monosulphides and polysulphides such as sodium sulphide and potassium sulphide, and substantially insoluble monosulphides and polysulphides such as calcium sulphide, manganese sulphide, iron sulphide, cobalt sulphide, nickel sulphide, copper sulphide, silver sulphide, cadmium sulphide, antimony sulphide and lead sulphide.

Thioalcohols, thiophenols, thioaldehydes and thioketones are mentioned as examples of organic sulphur compounds. It is of course also possible to use the corresponding anions and salts such as sodium thioethylate and silver thioethylate. It is also possible to use organic sulphur compounds which are not included in the above-mentioned groups, such as carbon disulphide and thiourea.

The ratio of sulphur and/or sulphur compound to the Group VIII noble metal is generally 0.5 to 30, preferably 1 to 15 and more particularly 2 to 5 mols of sulphur and/or sulphur compound per mol of noble metal oxide or sulphide.

The catalysts according to the invention can of course also be applied to supporting materials. An supporting materials known per se are suitable for this purpose, providing they are inert with respect to base and water. Examples of supporting materials such a these include $BaSO_4$, $Ca_3(PO_4)_2$, carbon. Active carbon is preferably used as the supporting material.

The catalysts according to the invention can be prepared in different ways:

In general, it is not necessary to combine the noble metal, oxide or sulphide and the sulphur and/or sulphur compound before they are used as catalyst in the process according to the invention, instead they can be individually added to the reaction mixture before the beginning of the reaction. It can be advantageous, especially in cases where the process according to the invention is carried out continuously, to arrange the noble metal, oxide or sulphide as a fixed bed or fluidised-bed catalyst in the reaction zone and continuously to add sulphur and/or a sulphur compound with the starting material and/or hydrogen or separately.

However, it can also be advantageous to add sulphur and/or a sulphur compound to the noble metal, oxide or sulphide before use and, optionally, intimately mix the components with one another. However, it can also be advantageous to suspend the noble metal, oxide or sulphide, optionally applied to a support, in an aqueous solution of a corresponding water-soluble metal salt and to precipitate the sulphur compound, for example the metal sulphide, polysulphide or metcaptide on the noble metal, oxide or sulphide, optionally applied to a support, by the addition of sulphide or polysulphide ions, for example by introducing hydrogen sulphide or by adding a water-soluble sulphide or by adding an organic compound containing the mercapto group.

In general, this method of preparation can be carried out with any water-soluble metal salts, for example halides, nitrates, sulphates, salts of organic acids such oxalates and acetates. However, it is preferred to use readily accessible salts such as chlorides, nitrates and sulphates.

Thioalcohols such as thioethanol, thiophenols and thio- and dithio-carboxylic acids are mentioned as examples of organic compounds containing the mercapto group. It is, of course, also possible to use their water soluble salts, such as their alkali salts.

In general, it is best to use involatile and/or insoluble sulphur compounds especially insoluble sulphides, for preparing the catalyst used in the process according to the invention. In this way, the catalysts retain their activity and selectivity over prolonged periods, even when they are repeatedly used in the process according to the invention and even in cases where the process according to the invention is carried out continuously, and give consistently high yields of 3-halogen- and 3,5-dihalogen-phenol.

In cases where volatile and/or soluble sulphur compounds are used in the preparation of the catalyst according to the invention, the catalyst may show a drop in its activity and selectivity after a while in cases where it is re-used in a new batch or when the process according to the invention is carried out continuously. For this reason, it can be advantageous to add more sulphur and/or sulphur compound to an already used catalyst before it is re-used. In cases where the process according to the invention is carried out continuously, it is advantageous in this case to add small quantities of sulphur and/or sulphur compound continuously as just described.

The quantity in which the catalyst according to the invention is used is by no means a critical parameter in the process according to the invention. It can be varied within wide limits. In general, the catalyst is used in a quantity of from 0.1 to 2 % by weight, based on the starting material used. In cases where the catalyst is applied to a support, it is used in a correspondingly larger quantity, generally in a quantity of from 1 to 20 % by weight, based on the starting material.

The process according to the invention is generally carried out at temperatures of from about 100° to about 350°C and preferably at temperatures of from about 180° to 330°C. On account of the vapour pressure of the compounds to be hydrogenated and the catalyst used, if any, at these temperatures, it is best to carry out the process under elevated pressure. In general, the process is carried out under a hydrogen pressure of from 20 to 250 atms., preferably under a hydrogen pressure of 40 to 220 atms. and, more particularly, under a hydrogen pressure of from 50 to 200 atms.

The reaction time is generally governed by the reaction temperature to the extent that, with increased reaction temperature and velocity, a shorter reaction time is required to obtain the same conversion. On account of this dependency, it is generally not possible to state the reaction time, although a reaction time over and above the required reaction time does not impair either the selectivity of dehalogenation or the yield through further undesirable dehalogenation.

In general, the process according to the invention is carried out in solution. It is possible for this purpose to use any solvents which are inert under the reaction conditions. It is preferred to use water, monohydric and polyhydric alcohols and also mixtures of the aforementioned solvents.

The process according to the invention is illustrated by the following reaction equation for the dehalogenation of 2,4,5-trichlorophenol into 3-chlorophenol:

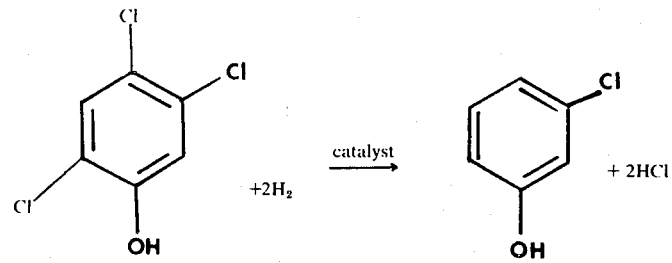

Since hydrogen halide is evolved during the reaction according to the invention, it is generally best to add a base as hydrogen halide acceptor to the reaction mixture before the reaction begins. The bases normally used as hydrogen halide acceptors can be used for this purpose. It is preferred to use tertiary amines, anilines, pyridine, also the hydroxides, carbonates, bicarbonates and acetates of the alkali metals, especially those of sodium and potassium, and of the alkaline earth metals, especially calcium hydroxide. The quantity in which the base is used is generally selected so that one equivalent of base is used per halogen atom of the starting compound which is not in the 3- or 5-position to the OH group. However, it is also possible to use an excess of base over and above this ratio.

In general, the process is carried out by introducing the starting material, solvent and hydrogen halide acceptor into an autoclave, adding the catalyst and displacing the air with nitrogen after the autoclave has been closed. Thereafter, the nitrogen is flushed out with hydrogen, the autoclave placed under the hydrogen pressure selected and the reaction carried out at the temperature selected. On completion of the reaction, the 3-halogen- or 3,5-dihalogen-phenol is dissolved or kept in solution as phenolate by the the addition of alkali hydroxide, and the catalyst separated off, for example by filtration. The catalyst-free solution is worked up by methods known per se, for example by acidification with a mineral acid, for example concentrated hydrochloric acid, extracting the 3-halogen- or 3,5-dihalogen-phenol by shaking with an organic solvent, for example methylene chloride, and subsequently working up the organic phase, for example by fractional distillation.

The process according to the invention can be carried out both in batches and also continuously. It can be particularly advantageous to carry out the process according to the invention continuously. The layout required for this purpose in terms of apparatus to enable the process to be carried out as a fixed-bed or fluidised-bed catalyst process, is known per se from the prior art, as is the continuous introduction of the starting and auxiliary materials required and the continuous isolation of the reaction product from the reaction mixture (cf. for example German Pat. Spec. No. 948,784).

The surprising advantage of the process according to the invention is that it enables corresponding higher-halogenated phenols to be selectively dehalogeneated into 3-halogen- and 3,5-dihalogen-phenol without difficulty by catalytic hydrogenation.

Another advantage of the process according to the invention is that it is also posssible to use as starting material mixtures which, in addition to the compounds of general formula I, also contain other halogen or polyhalogen phenols in which there is no halogen in the 3- or 5-position to the OH group. In the process according to the invention, these compounds are dehalogenated into phenol which is readily separated off by distillation. By contrast, separation of the corresponding halogen phenols from the compounds of general formula I in which R represents OH is both complicated and time-consuming (cf. for example DAS 1,543,367).

The 3-halogen- and 3,5-dihalogen-phenols which can be obtained by the process according to the invention correspond
to the general formula

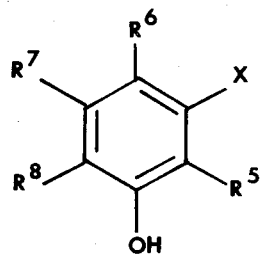

(II)

in which
X represents halogen;
$R^5$, $R^6$, $R^7$ and $R^8$ independently of one another represent hydrogen, an alkyl, aralkyl, aryl, alkoxy, aryloxy or alkylmercapto radical, or at least one of the radicals $R^5$, $R^6$ and $R^8$ represents hydrogen whilst the radical $R^7$ can also represent a hydroxy group and, in the case of 3,5-dihalogen-phenols, exclusively represents a halogen atom.

The following are examples of the halogen phenols which can be obtained by the process according to the invention: 3-bromophenol, 3-chlorophenol, 3,5-dichlorophenol, 5-chloro-o-cresol, 5-chloro-m-cresol, 3-bromo-p-cresol, 3-chloro-p-cresol, 3,5-dichloro-p-cresol, 3-bromo-p-cresol, 3,5-dibromo-p-cresol. 5-chloro-3,4-xylenol, 5-bromo-3,4-xylenol, 3-bromo-2,6-xylenol, 3,5-dibromo-2,6-xylenol, 3-bromo-2,5-xylenol, 3-chloro-4-ethylphenol, 3-chloro-4-propylphenol, 3-chloro-4-tert.-butylphenyl, 5-chlororesorcinol, 3-chloro-2-benzyl phenol, 2,2'-dihydroxy-6,6'-dichloro diphenylmethane, 4-chloro-2-hydroxy diphenyl, 4,4'-dihydroxy-2,6,2',6'-tetrachlorodiphenyl, 3-chloro-guaiacol, 5-chloro-guaiacol, 3,5-dichloro-guaiacol, 5-chloro-3-methoxy phenol, 3-chloro-4-methoxy phenol, 3,5-dichloro-4-methoxy phenol, 3-chloro-2-phenoxy phenol, 5-chloro-2-phenoxy phenol, 3,5-dichloro-2-phenoxy phenol, 5-chloro-3-phenoxy phenol, 3-chloro-4-phenoxy phenol, 3,5-dichloro-4-phenoxy phenol, 3-chloro-4-methylmercaptophenol, 3,5-dichloro-4-methylmercaptophenol.

3-Halogen- and 3,5-dihalogen-phenols are known intermediate products and are used in particular in the production of herbicides, plant growth regulants and pharmaceutical agents (German Pat. Nos. 921,970, 1,116,656, 814,152; U.S. Pat. Nos. 2,957,760, 3,080,225; German Offenlegungsschriften 1,906,551, 2,229,062; British Pat. No. 1,251,695).

EXAMPLES

A. Preparation of the catalyst

Examples 1 to 12

10 g of an approximately 5 % by weight noble metal active carbon (= 0.005 mol of metal) were introduced into a solution of 3 times the molar quantity of a water-soluble metal salt, based on the quantity of noble metal, in 200 ml of water, followed by heating with stirring to a temperature of 80°C. 2 g of $Na_2S . 3H_2O$ (0.015 mol of S), dissolved in 30 ml of water, were then slowly added dropwise in an inert-gas atmosphere (nitrogen). On completion of the addition, stirring was continued for 30 minutes at 80°C. The catalyst was then filtered off under suction and washed thoroughly with distilled water until free from sulphide. Individual Examples for the preparation of the catalyst in accordance with the general procedure described above are given in the following Table, in which the Example No. is given in column 1, the noble metal of the noble metal-active carbon in column 2 and the quantity and type of the aforementioned metal salt in column 3:

Table I

| Example No. | Noble metal | Metal salt |
|---|---|---|
| 1 | Pd | 4.2 g of $FeSO_4.7H_2O$ |
| 2 | Pd | 4.2 g of $CoSO_4.7H_2O$ |
| 3 | Pd | 3.6 g of $NiCl_2.6H_2O$ |
| 4 | Pd | 3.0 g of $MnCl_2.4H_2O$ |
| 5 | Pd | 5.7 g of $Pb(CH_3COO)_2.3H_2O$ |
| 6 | Pd | 2.56 g of $AgNO_3$ |
| 7 | Pd | 3.75 g of $CuSO_4.5H_2O$ |
| 8 | Pd | 3 g of $CdCl_2.H_2O$ |
| 9 | Pt | 4.2 g of $FeSO_4.7H_2O$ |
| 10 | Pt | 2.56 g of $Ag NO_3$ |
| 11 | Ru | 4.2 g of $FeSO_4.7H_2O$ |
| 12 | Rh | 4.2 g of $FeSO_4.7H_2O$ |

EXAMPLE 13

Following the procedure of Example 1, 10 g of an approximately 5 % by weight palladium-active carbon (=0.005 mol of palladium) were introduced into a solution of 4.2 g of $FeSO_4 . 7 H_2O$ in 200 ml of water, followed by heating with stirring to 80°C. 2.14 g of $Na_2S_3$, dissolved in 30 ml of water, were added dropwise in an inert-gas atmosphere (nitrogen). On completion of the addition, stirring was continued for another 30 minutes at a temperature of 80°C. The catalyst was then filtered off under suction and washed thoroughly with distilled water until free from sulphide.

EXAMPLES 14 to 21

The following Examples illustrate the preparation of catalysts simply by combining the noble metal and the sulphur or the sulphur compound; the two components can be combined whereas before addition to the substance to be hydrogenated or its solution and also in this substance or solution. To this end, 10 g batches of an approximately 5 % by weight noble metal active carbon (= 0.005 mol of metal) have added to them the quantities of sulphur and sulphur compound specified in Table II below (corresponding to 0.015 mol of sulphur).

The Example No. the noble metal of the noble metal-active carbon, and the quantity and type of sulphur compound appear as separate headings in the Table.

Table II

| Example No. | Noble Metal | g | Sulphur or sulphur compound |
| --- | --- | --- | --- |
| 14 | Pd | 2.6 | $Sb_2S_3$ |
| 15 | Pd | 1.0 | $Na_2S.3H_2O$ |
| 16 | Pd | 1.08 | CaS |
| 17 | Pd | 0.5 | S |
| 18 | Pd | 1.15 | $CS_2$ |
| 19 | Pd | 1.25 | $NaS.C_2H_5$ |
| 20 | Pd | 2.53 | $AgS.C_2H_5$ |
| 21 | Pt | 1.0 | $Na_2S.3H_2O$ |

EXAMPLE 22

10 g of an approximately 5 % by weight palladium sulphide-active carbon were introduced into a solution of 4.2 g of $FeSO_4 \cdot 7H_2O$ in 200 ml of water, followed by heating while stirring to a temperature of 80°C. A solution of 2 g of $Na_2S \cdot 3H_2O$ in 30 ml of water was slowly added dropwise in an inert-gas atmosphere (nitrogen). On completion of the addition, stirring was continued for another 30 minutes at 80°C. The catalyst was then filtered off under suction and washed thoroughly with distilled water until free from sulphide.

EXAMPLE 23

10 g of an approximately 5 % by weight platinum sulphide-active carbon were introduced into a solution of 4.2 g of $FeSO_4 \cdot 7H_2O$ in 200 ml of water, and the resulting solution was heated with stirring to 80°C. A solution of 2 g of $Na_2S \cdot 3H_2O$ in 30 ml of water was slowly added dropwise in an inertgas atmosphere (nitrogen). On completion of the addition, stirring was continued for another 30 minutes at 80°C. The catalyst was then filtered off under suction and washed thoroughly with distilled water until free from sulphide.

EXAMPLE 24

10 g of an approximately 5 % by weight palladium oxide-active carbon were introduced into a solution of 4.2 g of $FeSO_4 \cdot 7H_2O$ in 200 ml of water, followed by heating with stirring to 80°C. A solution of 2 g of $Na_2S \cdot 3H_2O$ in 30 ml of water was slowly added dropwise in an inert-gas atmosphere (nitrogen). On completion of the addition, stirring was continued for 30 minutes at 80°C. The catalyst was then filtered off under suction and washed thoroughly with distilled water until free from sulphide. B. Process Examples

EXAMPLE 25

81 g of 2,5-dichlorophenol (2.5 mol), 22 g of NaOH (0.55 mol) and 240 ml of water were introduced into a 2.7 litre capacity hydrogenation autoclave (equipped with a stirring mechanism). 10 g of the catalyst prepared in accordance with Example 1 were added.

The autoclave was closed, the air present in it was displaced with nitrogen and the nitrogen subsequently flushed out with hydrogen. The contents of the autoclave were then heated to 260°C and hydrogenated for 15 minutes under a hydrogen pressure of about 40 to 60 atoms. On completion of hydrogenation, 30 ml of concentrated sodium hydroxide (~0.5 mol) were added to the reaction mixture. The reaction mixture was stirred briefly and vigorously, and the catalyst filtered off from the liquid reaction mixture. The catalyst was washed with 300 to 400 ml of warm water (approximately 60° to 70°C), and can be subsequently re-used. The reaction solution which accumulated as filtrate was cooled and acidified at room temperature with 70 ml of concentrated hydrochloric acid (~0.8 mol of HCl). The aqueous mixture was extracted by shaking with about 150 ml of methylene chloride in several portions. The organic phases which accumulated were combined and dried over $Na_2SO_4$.

The solvent (methylene chloride) was then distilled off and the liquid residue distilled at around 100°C/10 mm Hg. 61.5 g of 3-chlorophenol were obtained, corresponding to a yield of 96.4 % of the theoretical yield. Analysis by gas chromatography produced the following results:

99.36 % of 3-chlorophenol
0.08 % of 2,5-dichlorophenol
0.55 % of phenol.

EXAMPLES 26 to 46

Table III below shows the results of Examples 26 to 46 which were carried out in the same way as Example 25, except that the hydrogenation time and temperature was varied.

Table III

| Example No. | Time mins. | Temp. °C | Yield % of theoretical | %3CP | Analysis %2,5DCP | %P | %2-CP |
| --- | --- | --- | --- | --- | --- | --- | --- |
| 26 | 30 | 230 | 79 | 82.7 | 17.0 | 0.20 | 0.10 |
| 27 | 30 | 240 | 85 | 94.5 | 5.1 | 0.33 | 0.08 |
| 28 | 30 | 250 | 90 | 99.2 | 0.09 | 0.68 | — |
| 29 | 30 | 260 | 90 | 99.2 | 0.17 | 0.65 | — |
| 30 | 60 | 220 | 73 | 79.6 | 20.1 | 0.12 | 0.07 |
| 31 | 60 | 230 | 90 | 98.1 | 1.2 | 0.48 | 0.03 |
| 32 | 60 | 240 | 92 | 98.4 | 0.39 | 0.74 | — |
| 33 | 60 | 250 | 91 | 97.9 | 0.31 | 1.31 | 0.43 |
| 34 | 60 | 260 | 87 | 98.8 | — | 1.24 | — |
| 35 | 120 | 200 | 73 | 82.3 | 16.7 | 0.40 | 0.49 |
| 36 | 120 | 210 | 91 | 96.1 | 2.5 | 0.23 | 0.03 |
| 37 | 120 | 220 | 92 | 98.8 | 0.59 | 0.53 | 0.02 |
| 38 | 120 | 230 | 88 | 96.5 | 0.07 | 3.4 | — |
| 39 | 120 | 240 | 88 | 96.2 | 0.98 | 1.4 | — |
| 40 | 120 | 250 | 86 | 97.0 | 0.02 | 1.6 | 0.41 |
| 41 | 120 | 260 | 87 | 97.2 | 0.30 | 2.5 | — |
| 42 | 240 | 220 | 91 | 98.7 | 0.10 | 1.15 | — |
| 43 | 240 | 230 | 85 | 96.9 | 0.15 | 2.9 | — |
| 44 | 240 | 240 | 89 | 96.3 | — | 3.7 | — |
| 45 | 240 | 250 | 85 | 94.4 | — | 5.6 | — |
| 46 | 240 | 260 | 76 | 90.2 | — | 9.8 | — |

The abbreviations used for the results of analysis both in Table IV below and in the following tables have the following meanings:

3 — CP = 3-chlorophenol
2,5 — DCP = 2,5-dichlorophenol
P = phenol
2 — CP = 2-chlorophenol

EXAMPLES 47 to 49

Following the procedure of Example 25, 81 g of 2,5-dichlorophenol, 22 g of NaOH and a mixture of 120 ml of water and 120 ml of methanol were hydrogenated for 120 minutes under a hydrogen pressure of 80 to 90 atms. at the temperatures specified in Table IV below. On completion of hydrogenation and separation of the catalyst, the methanol was distilled off from the reaction solution. The aqueous solution was further worked up in the same way as described in Example 25. The results obtained are set out in the following Table:

Table IV

| Example No. | Time mins | Temp. °C | Yield % of theoretical | %3-CP | Analysis %2,5-CP | %P | %2-CP |
|---|---|---|---|---|---|---|---|
| 47 | 120 | 210 | 83 | 85.2 | 13.4 | 0.34 | 0.07 |
| 48 | 120 | 220 | 87.5 | 96.8 | 2.8 | 0.45 | 0.04 |
| 49 | 120 | 230 | 94 | 98.9 | 0.4 | 0.60 | 0.02 |

EXAMPLES 50 to 52

81 g of 2,5-dichlorophenol and 240 ml of water were introduced into a >0.7 litre capacity hydrogenation autoclave in the same way as in Example 25, except that different quantities of sodium hydroxide, as specified in Table VI below, were added. Hydrogenation was carried out over a period of 120 minutes at 230°C under a hydrogen pressure of 80 to 90 atms. On completion of hydrogenation, 30 ml of concentrated sodium hydroxide were added to the reaction mixture, and the reaction mixture stirred briefly and vigorously. Thereafter the catalyst was filtered off under suction from the liquid reaction mixture and washed with 300 to 400 ml of warm water (approximately 60° to 70°C); it can subsequently be re-used.

The reaction solution which accumulated as filtrate was cooled and acidified at room temperature with 70 ml of concentrated hydrochloric acid. The aqueous mixture was extracted by shaking with approximately 150 ml of methylene chloride in several portions. The organic phases which accumulated were combined and dried over $Na_2SO_4$. The solvent was then distilled off and the residue distilled at around 100°C/10 mm Hg. Table V below shows as separate headings the Example No., the quantity of sodium hydroxide used, the yield obtained and its composition according to analysis by gas chromatography.

Table V

| Example No. | NaOH g | Yield | %3-CP | %2,5-DCP | %P | %2-CP |
|---|---|---|---|---|---|---|
| 50 | 30.0 | 91.5 | 94.8 | 1.6 | 3.5 | 0.05 |
| 51 | 22.0 | 93 | 96.5 | 0.07 | 3.4 | 0 |
| 52 | 18.0 | 92 | 93.7 | 5.2 | 0.95 | 0.20 |

EXAMPLES 53 to 75

In these Examples, batches of 81 g of 2,5-dichlorophenol and 22 g of NaOH were hydrogenated at 230°C in a mixture of 120 ml of water and 120 ml of glycol. 10 g of a catalyst prepared in accordance with Examples 1 to 24 were used as catalyst in each test. The hydrogenation time selected is specified in the following Table. The aqueous glycol solution is worked up in the same way as described in Example 25. The results of these Examples are set out in the following Table:

Table VI

| Example No. | Catalyst according to Example No. | Time mins | Yield g % of theoretical | %3-CP | %2,5-DCP | %P | %2-CP |
|---|---|---|---|---|---|---|---|
| 53 | 1 | 120 | 89.5 | 99.1 | 0.50 | 0.38 | 0.22 |
| 54 | 2 | 120 | 88 | 93.3 | 0.08 | 5.14 | 0.07 |
| 55 | 3 | 120 | 65 | 74.3 | 5.8 | 15.0 | — |
| 56 | 4 | 120 | 65 | 74.5 | 6.2 | 13.2 | 6.0 |
| 57 | 5 | 120 | 80 | 84.4 | 15.2 | 0.23 | 0.10 |
| 58 | 6 | 70 | 88 | 98.1 | 0.80 | 0.83 | 0.07 |
| 59 | 7 | 120 | 88 | 99.1 | 0.10 | 0.73 | — |
| 60 | 8 | 120 | 83 | 90.0 | 2.0 | 5.7 | 0.60 |
| 61 | 9 | 90 | 90 | 98.5 | 1.53 | — | — |
| 62 | 11 | 120 | 78 | 87.0 | 2.8 | 9.9 | 0.21 |
| 63 | 12 | 90 | 93 | 96.4 | 2.5 | 1.0 | 0.13 |
| 64 | 13 | 120 | 85 | 99.3 | 0.54 | 0.19 | — |
| 65 | 14 | 120 | 87 | 94.8 | 4.4 | 0.40 | 0.10 |
| 66 | 15 | 120 | 80 | 98.0 | 0.10 | 1.9 | 0.03 |
| 67 | 16 | 120 | 91 | 98.4 | 0.03 | 1.6 | — |
| 68 | 17 | 80 | 93 | 98.4 | 0.60 | 0.70 | — |
| 69 | 18 | 60 | 89 | 98.5 | 0.56 | 0.25 | — |
| 70 | 19 | 120 | 80 | 90.7 | 0.46 | 7.1 | 0.41 |
| 71 | 20 | 120 | 93.5 | 98.4 | 0.03 | 0.5 | — |
| 72 | 21 | 120 | 90 | 99.6 | 0.02 | 0.35 | — |
| 73 | 22 | 120 | 84 | 92.5 | 3.6 | 3.5 | 0.40 |
| 74 | 23 | 120 | 91.5 | 99.7 | 0.08 | 0.2 | — |
| 75 | 24 | 120 | 86.5 | 98.3 | trace | 1.7 | — |

EXAMPLE 76

98.7 g (0.5 mol) of 2,4,5-trichlorophenol, 22 g (0.55 mol) of NaOH, 40 g (0.4 mol) of $Na_2CO_3$, 240 ml of water and the catalyst prepared in accordance with Example 1 were introduced into a 0.7 litre hydrogenation autoclave in the same way as described in Example 25. Hydrogenation was carried out over a period of 2 hours at 230°C under a hydrogen pressure of 60 atms. On completion of hydrogenation, the aqueous solution was worked up as described in Example 25.

57 g of distillate with the following composition were obtained:

| | |
|---|---|
| 2-chlorophenol | 0.01 % |
| phenol | 1.23 % |
| 2,5-dichlorophenol | 0.02 % |
| 3-chlorophenol | 98.24 % |

The resulting yield of 3-chlorophenol corresponds to 87 % of the theoretical yield:

EXAMPLE 77

52 g (0.3 mol) of 2,5-dibromophenol, 25 g (0.3 mol) of $NaHCO_3$, 300 ml of water and 10 g of the catalyst prepared in accordance with Example 10, were introduced into a 0.7 litre hydrogenation autoclave as described in Example 25. Hydrogenation was carried out over a period of 1.5 hours at 190°C under a hydrogen pressure of 150 atms.

On completion of hydrogenation, 30 ml of concentrated sodium hydroxide were added to the reaction mixture which was then stirred briefly and vigorously and subsequently filtered off from the catalyst. The filtrate was cooled and acidified with 70 ml of concentrated hydrochloric acid. This aqueous mixture is extracted by shaking with a total of about 150 ml of methylene chloride in several portions. The organic phases were separated off, combined and dried over $Na_2SO_4$. The methylene chloride was distilled off from the dry organic phase and the liquid residue distilled in vacuo at around 110°C/10 mm Hg. 34.0 g of distillate of the following composition were obtained:

| | |
|---|---|
| 2-bromophenol | 0.39 % |
| phenol | 4.31 % |
| 2,5-dibromophenol | 0.04 % |
| 3-bromophenol | 95.25 % |

The yield of 3-bromophenol corresponded to 91 % of the theoretical yield.

EXAMPLE 78

55 g (0.15 mol) of 2,3,6-tribromo-4-chlorophenol, 42 g (0.5 mol) of $NaNCO_3$ and 300 ml of water were introduced with 10 g of the catalyst prepared in accordance with Example 10 into a 0.7 litre hydrogenation autoclave, and hydrogenated for about 1.5 hours at 200°C/150 atms. hydrogen pressure as in Example 25. Working up was carried out as described in Example 25, giving 17 g of distillate with the following composition:

| | |
|---|---|
| phenol | 23.2 % |
| 4-chlorophenol | 9.1 % |
| 3-bromophenol | 67.95 % |

EXAMPLE 79

As in Example 25, 59 g (0.33 mol) of 3,4-dichloro-6-methyl-phenol, 15 g (0.375 mol) of NaOH and 300 ml of water were introduced with the catalyst prepared in accordance with Example 1 into a >0.7 litre hydrogenation autoclave, and hydrogenated for 30 minutes at 250°C/100 atms. hydrogen pressure. Working up was carried out in the same way as described in Example 25, giving 43 g of distillate with the following composition:

| | |
|---|---|
| 2 cresol | 1.41 % by weight |
| 3-chloro-6-methylphenol | 98.59 % by weight |

The yield of 3-chloro-6-methylphenol corresponded to 90 % of the theoretical yield. M.p. 73°–74°C (ligroin).

EXAMPLE 80

As in Example 25, 35.5 g (0.16 mol) of 2,5-dichloro-4-tert.-butylphenol were hydrogenated with 7.1 g (0.18 mol) of NaOH in 300 ml of water for 30 minutes at 240°C/100 atms. hydrogen pressure on the catalyst prepared in Example 1. Working up was carried out in the same way as described in Example 25, giving 25.5 g of distillate with the following composition:

| | |
|---|---|
| 4-tert.-butylphenol | 12 % |
| 3-chloro-4-tert.-butylphenol | 83.3 % |
| 2,5-dichloro-4-tert.-butylphenol | 4.7 % |

The yield of 3-chloro-4-tert.-butylphenol amounted to 72 % of the theoeretical yield. M.p. 65°–66°C (petroleum ether).

EXAMPLE 81

As in Example 25, 133 g (0.5 mol) of pentachlorophenol were hydrogenated in a solution of 105 g (1 mol) of $Na_2CO_3$ in 220 ml of water over a period of 25 minutes at 260°C/150 atms. hydrogen pressure using the catalyst prepared in accordance with Example 1. Working up was carried out in the same way as described in Example 25, giving 67 g of distillate of the following composition:

| | |
|---|---|
| 2-chlorophenol | 0.27 % |
| phenol | 0.31 % |
| B(D—DICHLOROPHENOL | 0.46 % |
| 3-chlorophenol | 10.94 % |
| 3,5-dichlorophenol | 88.02 % |

The yield of 3,5-dichlorophenol isolated by distillation amounted to 75 % of the theoretical yield.

EXAMPLE 82

32 g (0.13 mol) of tetrachloro resorcinol were hydrogenated in a solution of 42 g (0.5 mol) of $NaHCO_3$ in 300 ml of water for 1.5 hours at 180°C/150 atms. hydrogen pressure using the catalyst prepared in accordance with Example 10. The reaction solution was concentrated by evaporation to dryness after the catalyst had been filtered off. The solid residue was sublimated and gave 7 g (27 % of the theoretical) of pure 5-chloro resorcinol. M.p. 115°–116°C.

EXAMPLE 83

40 g (0.087 mol) of 4,4'-dihydroxy octachlorodiphenyl were hydrogenated in a solution of 29 g (0.35 mol) of $NaHCO_3$ in 300 ml of water over a period of 10 minutes at 270°C/150 atms. hydrogen pressure using catalyst prepared in accordance with Example 1.

Working up was carried out as described in Example 25. The residue was recrystallised from diisopropyl ether, and gave 21.5 g of pure 4,4'-dihydroxy-2,2'-6,6'-tetrachlorodiphenyl (75 % of the theoretical). M.p. 186°–187°C.

EXAMPLE 84

60 g of 2,4-bis-(dimethylamino)-3,6-dichlorophenol, 10 g of the catalyst of Example 10 and 300 ml of toluene, were introduced into a 0.7 litre capacity hydrogenation autoclave (equipped with a stirring mechanism). The autoclave was closed, the air present in it is displaced with nitrogen and the nitrogen subsequently flushed out with hydrogen. The contents of the autoclave were then heated to 200°C and hydrogenated for 60 minutes under a hydrogen pressure of 200 atms. On completion of hydrogenation, the catalyst was filtered off under suction, the toluene solution washed with approximately 300 ml of 2 N HCl and subsequently dried with $Na_2SO_4$. The solvent was distilled off and the residue distilled, giving 32.5 g of a crude product of which 92.47 % consisted of 2,4-dimethyl-3-chlorophenol, corresponding to a yield of 89 % of the theoretical yield. Melting pointing 67°–68°C (petroleum ether).

EXAMPLE 85

As in Example 25, 60 g of 2,4-bis-(dimethylaminomethyl)-2,6-dichlorophenol, 10 g of the catalyst of Example 1 and 300 ml of water were hydrogenated for 60 minutes at 150°C under a hydrogen pressure of 200 atms. Working up was carried out as described in Example 25, and gave 24.7 g of crude product, of which 81.39 % consisted of 2,4-dimethyl-3-chlorophenol, corresponding to a yield of 59.5 % of the theoretical yield.

EXAMPLE 86

As in Example 84, 38 g of 2-(dimethylaminomethyl)-3,4,6-trichlorophenol, 12 g of pyridine, 10 g of the catalyst of Example 1 and 300 ml of toluene were hydrogenated for 60 minutes at 250°C under a hydrogen pressure of 200 atms. Working up was carried out as described in Example 84, and gave 16 g of a crude product, of which 98.08 % consisted of 3-chloro-o-cresol, corresponding to a yield of 76 % of the theoretical yield.
Melting point 84°C (ligroin).

EXAMPLE 87

As in Example 84, 22.5 g of 5,6,8-trichloro-1,3-benzodioxane, 15 g of pyridine, 6.2 g of the catalyst of Example 10 and 200 ml of toluene were hydrogenated for 60 minutes at 280°C under a hydrogen pressure of 200 atms. Working up was carried out as described in Example 84, giving 10 g of a crude product of which 85.37 % consisted of 3-chloro-o-cresol, corresponding to a yield of 63.5 % of the theoretical yield. Melting point 84°C (ligroin).

EXAMPLE 88

As in Example 25, 20 g of tetrachloro guaiacol, 13 g of $NaHCO_3$, 5 g of the catalyst of Example 10 and 240 ml of water were hydrogenated for 30 minutes at 200°C under a hydrogen pressure of 200 atms. Working up was carried out as described in Example 25, and give 13.5 g of a crude product of which 74 % consisted of 3,5-dichloro guaiacol, corresponding to a yield of 68 % of the theoretical yield. Melting point: 59°–60°C (petroleum ether).

EXAMPLE 89

As in Example 25, 34 g of 4,5-dichloro-2-phenoxyphenol, 9 g of $NaHCO_3$, 10 g of the catalyst of Example 10 and 300 ml of water were hydrogenated for 90 minutes at 230°C under a hydrogen pressure of 200 atms. Working up was carried out as described in Example 25, giving 26 g of a crude product of which 84.5% consisted of 5-chloro-2-phenoxyphenol, corresponding to a yield of 74% of the theoretical yield. $B.p._1$ : 130°–133°.

EXAMPLE 90

As in Example 25, 42 g of 2,5-dichloro-4-methylmercapto pehnol, 18 g of $NaHCO_3$, 10 g of the catalyst of Example 10 and 240 ml of water were hydrogenated for 75 minutes at 200°C under a hydrogen pressure of 200 atms. Working up was carried out as described in Example 25, giving 33.2 g of a crude product of which 78.7% consisted of 3-chloro-4-methylmercaptophenol, corresponding to a yield of 67.5% of the theoretical yield. After recrystallisation from cyclohexane, the 3-chloro-4-methylmercaptophenol melted at 59°–60°C.

EXAMPLE 91

As in Example 84, 41 g of 2,2'-dihydroxy-3,5,6,3',5',6'-hexachlorodiphenyl methane (hexachlorophene), 33 g of pyridine, 5 g of the catalyst of Example 1 and 300 ml of toluene were hydrogenated for 60 minutes at 230°C under a hydrogen pressure of 299 atms. Working up was carried out as described in Example 84, giving 18 g of a crude product of which 81.3% consisted of 2,2'-dihydroxy-6,6'-dichloro diphenyl methane, corresponding to a yield of 55% of the theoretical yield. After recrystallisation from toluene, the 2,2'-dihydroxy-6,6'-dichlorodiphenyl methane melted at 176°–180°C.

What is claimed is:
1. Process for preparing 3-halogen- and 3,5-dihalogen-phenols by the dehalogenation of higher halogenated phenols which comprises reacting a halogen compound having the formula

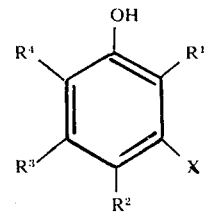

wherein

X is halogen $R^1, R^2, R^3$, and $R^4$ independently of one another are selected from the group of hydrogen, halogen, alkyl having up to 12 carbon atoms, benzyl, phenyl, benzyl and phenyl substituted by hydroxy, halogen and/or linear or branched alkyl having up to 12 carbon atoms alkoxy having up to 12 carbon atoms, phenoxy alkyl mercapto having up to 12 carbon atoms, and dialkylaminomethyl wherein the alkyl groups contain up to 12 carbon atoms, with the proviso that at least one of $R^1$, $R^2$ or $R^4$ is halogen and when 3,5-dihalogen-phenols are prepared, $R^3$ is halogen,
with hydrogen at a temperature of from 100° to 350°C under a hydrogen pressure of from 20 to 250 atm in the presence of 0.1 to 20% by weight of a catalyst comprising a noble metal of Group VIII of the Periodic System, or an oxide or sulfide thereof, and sulphur and/or a sulphur compound selected from the group of sodium sulphide, potassium sulphide, calcium sulphide, manganese sulphide, iron sulphide, cobalt sulphide, nickel sulphide, copper sulphide, silver sulphide, cadmium sulphide, antimony sulphide, lead sulphide, sodium thioethylate, silver thioethylate, carbon disulphide and thiourea, in a ratio of 0.5 to 30 mol of sulphur or sulphur compound to one mol of said noble metal or oxide or sulfide thereof.

2. Process of claim 1 wherein the reaction takes place in the presence of the elements palladium and/or platinum.

3. Process of claim 1 wherein the reaction takes place in the presence of palladium-active carbon and iron-(II)-sulphide.

4. Process of claim 1 wherein the catalyst is used in a quantity of 0.1 to 2% by weight based on the starting material.

5. Process of claim 1 wherein the catalyst is supported on a carrier.

6. Process of claim 1 wherein the reaction is carried out in inert solvent solution.

7. Process of claim 1 wherein 2 to 5 mols of sulphur and/or sulphur compound are used per mol of noble metal or compound thereof.

8. Process of claim 1 wherein 4,4'-dihydroxy octachlorodiphenyl is used as starting material for the production of 4,4'-dihydroxy-2,2',6,6'-tetrachlorodiphenyl.

* * * * *

UNITED STATES PATENT AND TRADEMARK OFFICE
CERTIFICATE OF CORRECTION

PATENT NO. : 3,912,783
DATED : October 14, 1975
INVENTOR(S) : Karlfried Wedemeyer, et al It is certified that error appears in the above-identified patent and that said Letters Patent are hereby corrected as shown below:

| | |
|---|---|
| Column 4, | Last letter of the the line in the entire column omitted by printing. |
| Column 6, line 6 | In the reaction equation, under "catalyst" insert -- $\Delta$ --. |
| Column 10, line 8 | Change "2.7" to --0.7--. |
| Column 14, line 45 | Change "B(d-DICHLOROPHENOL" to --2,4-dichlorophenol--. |

Signed and Sealed this first Day of June 1976

[SEAL]

Attest:

RUTH C. MASON
Attesting Officer

C. MARSHALL DANN
Commissioner of Patents and Trademarks